Dec. 12, 1933.　　　R. E. MALLES　　　1,939,073
TEMPERATURE CONTROL APPARATUS
Filed Jan. 7, 1928
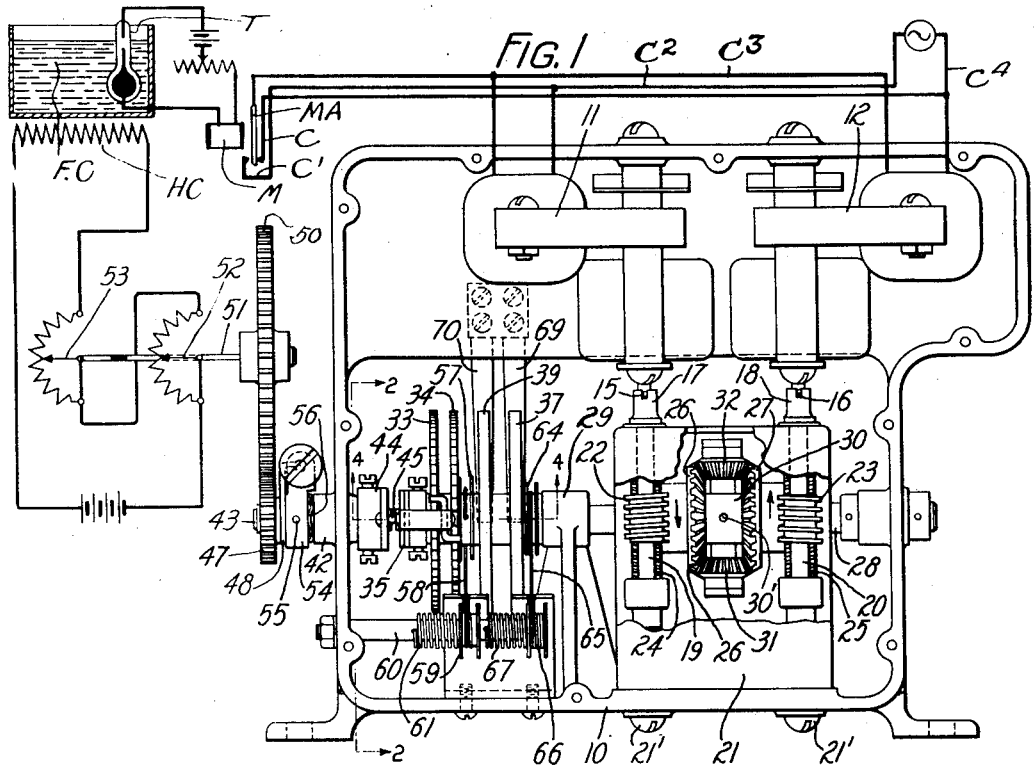
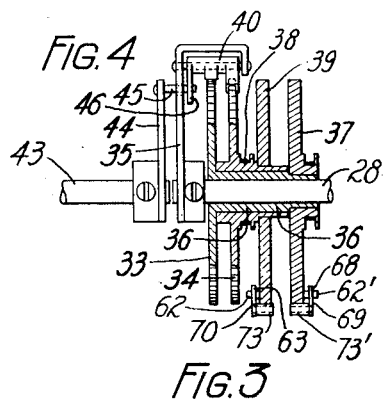
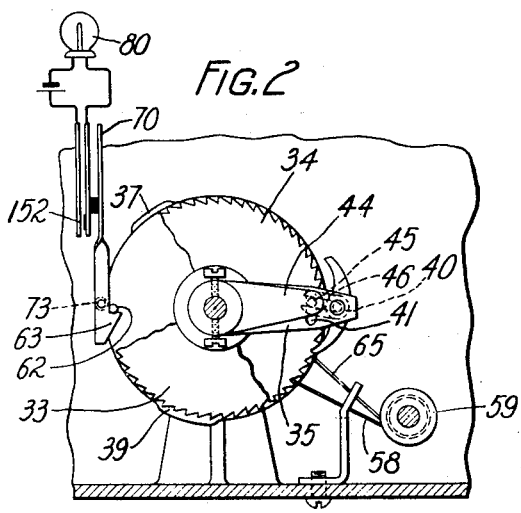
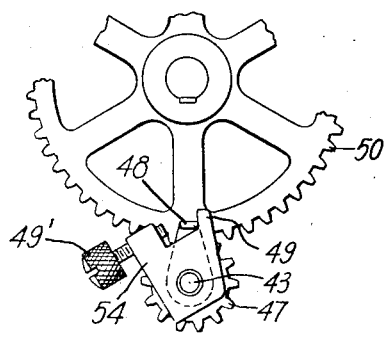
INVENTOR
RALPH E. MALLES
BY Irving Mac Donald
ATTORNEY Patented Dec. 12, 1933

1,939,073

UNITED STATES PATENT OFFICE 1,939,073

TEMPERATURE CONTROL APPARATUS

Ralph E. Malles, Brooklyn, N. Y., assignor to Bell Telephone Laboratories, Incorporated, New York, N. Y., a corporation of New York Application January 7, 1928. Serial No. 245,063

3 Claims. (Cl. 177—311)

This invention relates to temperature control apparatus, and is particularly well adapted for use in a system disclosed in Patent 1,757,727, dated May 6, 1930, to W. A. Marrison. In that system a thermometer is immersed in a bath heated by a coil and controls the temperature of said bath by a rheostat actuated by the operation of two alternating current motors. In such a system the temperature of the bath must be maintained within a few degrees of temperature difference from a fixed temperature of substantially 35° C., and any substantial change in the temperature above or below these limits will correspondingly affect the apparatus controlled thereby such as the tuning fork of an oscillator circuit which may be located in the bath. In that system, since the room temperature in which the tuning fork chamber and the different operating apparatus are located is maintained within a few degrees of temperature difference, it follows that under normal operating conditions of the tuning fork the maximum travel or sweep of the brushes is only a small angular distance on either side of the position shown in Fig. 1 of said application. Now, the position of the brushes anywhere along the small angular distance corresponds to the normal operating condition of the tuning fork chamber. It is apparent that the limits of movement of the brushes to take care of the difference in temperature are not fixed but may occupy different sectors of the rheostat resistance. However, due to the small angular sweep of the rheostat, it is obvious that a relatively small number of resistance coils is all that is necessary in the heater circuit to take care of this temperature difference and that a movement of brushes 52 and 53 beyond this small angular sweep will cause the operation of the signals before the brushes reach the last few coils at both ends of the rheostat.

The object of this invention is to provide alarm devices which operate upon predetermined maximum and minimum temperature limits in the bath for indicating any defect in the operating circuit of the heating elements and under certain conditions defects in the operating circuit of the motors.

In accordance with this invention, cams which operate alarm signals are actuated by the motors which move the rheostat brushes and are so arranged that they are returned to normal each time the direction of the movement of the driving shaft of the rheostat brushes is changed. By virtue of this construction, whatever may be the normal range for given room temperature and whatever may be the normal operating point of the brushes in that range, the cams occupy their normal position to correspond with the normal position of the rheostat brushes.

In the accompanying drawing, Fig. 1 is a plan view of the device with the cover of the housing removed. Fig. 2 is a sectional view of the ratchet mechanism taken approximately on line 2—2 of Fig. 1 with portions of the ratchet wheels and cams actuated thereby cut away. Fig. 3 is a detail view of the coupling mechanism for transmitting motion to the rheostat shaft and Fig. 4 is a sectional view of the ratchet mechanism taken approximatetly on line 4—4 of Fig. 1.

The rheostat controlling mechanism of this invention consists of a housing 10 in which two alternating current motors 11 and 12 are mounted. These motors are controlled by an electromagnet M in the thermometer circuit. This magnet is in turn controlled by the operation of the thermometer and operates its armature for alternately closing one of the motor circuits depending upon the engagement of the magnet armature MA with the contacts C and C1 as will be hereinafter described in detail. The armature shaft of each motor carries a pin 15 and 16, each disposed in engaged relation in their respective slots in bushings 17 and 18. These bushings are secured at the end portions of their respective shafts 19 and 20 which are journaled in a casing 21 in turn secured in casing 10 by screw 21'. Shaft 19 carries a right hand worm screw 22 and shaft 20 carries a left hand worm screw 23. These worm screws mesh with respectively associated worm wheels 24 and 25 mounted on the hub portions of pinions 26 and 27 respectively. These pinions are loosely mounted on a shaft 28 which is journaled at one end portion in casing 10 and at its middle portion in bracket 29 in turn mounted securely on casing 10.

On shaft 28 there is mounted a cross arm 30 on which the satellite gears 31 and 32 are loosely mounted. This cross arm is held securely on shaft 28 by pin 30'. Through the engagement of gears 31 and 32 with pinions 26 and 27 it is obvious that the independent movement of motors 11 and 12 is effective to actuate the shaft 28 either in a clockwise or counter-clockwise direction.

The other or inner disposed end portion of shaft 28 supports a pair of ratchet wheels 33 and 34 which are independently actuated by the movement of a common lever member 35 carried by shaft 28. As shown in Fig. 4, ratchet wheel 33 has a hub portion 36 on the end of which cam member 37 is mounted. Similarly, ratchet wheel 34 has a hub portion 38 which is loosely mounted on hub 36 and carries cam member 39.

Ratchet wheels 33 and 34 are disposed in engageable relation with a double pawl 40 adapted for independently engaging these wheels upon a clockwise or counter-clockwise movement of shaft 28. In bearing portion 42 of casing 10 and coaxially disposed with respect to shaft 28 there is mounted a spindle 43 on the inner disposed end of which is mounted a lever member 44 which carries at its free end portion a pin 45. This pin extends through an aperture 41 in lever 35 in engageable relation with a radially extending arm 46 carried by double pawl 40. On the outer end portion of shaft 43 there is loosely mounted a pinion 47 which carries an arm 48. The free end portion of this arm is bent at right angles and extends in operable relation with a fork shaped driving member 54 secured on spindle 43 by pin 55. On spindle 43 between the adjacent faces of arm 54 and bearing portion 42 there is disposed a spring washer 56 adapted for preventing the free rotary movement of spindle 43 and forked member 54 and lever 44 carried thereby with respect to arm 48 and lever 35 respectively. Pinion 47 meshes with gear 50 mounted on shaft 51 which carries the rheostat brushes 52 and 53.

On ratchet wheel 34 there is mounted pulley 57 in the groove of which one end of strand 58 is secured. The other end portion of strand 58 is wound around a drum 59 which is loosely mounted on a spindle 60 but engaging one end portion of a normally tensioned coiled spring 61. The other end portion of this spring engages an aperture in shaft 60 and is thereby held securely in position. On cam 39 there is provided a pin 62 shown in Figs. 2 and 4 which cooperates with a stop 63 carried by a contact operating member 70 for stopping the cam 39 upon its return movement in normal position by the tension of coiled spring 61 and a camming surface which forms the stop 63 is provided for permitting the movement of ratchet wheel 34 and cam 39 carried thereby in the direction indicated by the arrow when actuated by double pawl 40. Similarly, the resetting mechanism for cam 37 consists of a pulley 64 in the groove of which is attached one end of a strand 65, the other end portion of which is attached on a drum 66 loosely mounted on spindle 60. Drum 66 engages one end portion of a coiled spring 67 the other end portion of which is secured on spindle 60 in a manner similar to that of spring 61. Cam 37 carries a pin 62' adapted to engage a stop 68, carried by a contact operating member 69 for stopping the cam 37 when returned to normal position by the tension of spring 67. The contact operating members 70 and 69 are provided with respective roller members 73, 73' which are disposed in engageable relation with their respective camming members 37 and 39. The operation of contact operating members 69 and 70 are effective to control the operations of associated contacts such as 152 for causing the operation of electric signaling devices such as lamp 80 in the circuit shown in Fig. 2.

In a typical example of operation of the device, supposing that the temperature of the bath FC is below its operating requirement, of course the magnet M as shown in Fig. 1 is deenergized and the circuit of motor 12 closed at the rear contact of armature MA, the contact C, the wires C2 and C3 and the common wire C4, the operating circuit of motor 11 being open at the front contact of armature MA and therefore is not operated. The movement of motor 12 is effective to rotate gear 27 in the direction indicated by the arrow. The movement of this gear is effective to rotate shaft 28 in the same direction through its engagement with the satellite gears 31 and 32 which in turn engage stationary gear 26. Upon the movement of shaft 28 and lever 35 carried thereby and the engagement of radial arm 46 with pin 45 of lever 44 the double pawl 40 is caused to engage the ratchet wheel 34 for rotating its associated cam 39 and lever 44. The movement of lever 44 within the angular distance defined by the two stops 49 and 49' of forked member 54 is ineffective to operate gear 47 and therefore this movement has no effect on the rheostat shaft 51. However, upon the engagement of lever 48 with the fixed stop 49 the movement of shaft 28 is effective to impart its movement to the rheostat shaft 51 and the brushes carried thereby in the direction indicated for engaging their associated terminals and thereby cutting resistance out for increasing the temperature of the heater HC. In such rheostat controlling mechanism it has been found necessary to permit the shaft 28 to rotate a certain ineffective angular distance with respect to the rheostat brushes in order that the temperature in the chamber in which the tuning fork is enclosed be given sufficient time to rise or fall to the degree corresponding to the adjustment of the rheostat brushes which prevents the so-called hunting movements of the rheostat brushes. The aperture 41 in lever 35 is of such length that no movement is imparted to lever 44 until the double pawl 40 is fully engaged with one of the ratchet wheels 33 and 44, the engagement of these ratchet wheels by pawl 45 being dependent upon the direction of movement of shaft 28 under control of motors 11 and 12. It is to be noted that when the bath FC is at its normal operating condition, that is 35° C. for a given outside temperature, the value of the rheostat controlling the temperature of the bath is such that the brushes 52 and 53 occupy the position shown in Fig. 1. Then upon a change, plus or minus, in the outside temperature the bath FC will of course be similarly affected and this change of temperature must be compensated by the adjustment of the rheostat. This is effected automatically by the thermometer device T which controls the operation of the motors 11 and 12 which in turn actuate the rheostat brushes 51 and 52. Now, while the temperature of the bath rises or falls as the case may be to its normal operating position of 35° C. the brushes 52 and 53 of the rheostat no longer rest on the middle position of the contacts but may rest in any position on the sides of the normal middle operating position. Upon the adjustment of the rheostat brushes by the movement of shaft 28 and due to the speed ratio of gears 47 and 50, one of the cams 37 and 38 has been turned a considerable angular distance through the engagement of the double pawl 40 with the ratchet wheels 33 and 34 as the case may be. Then, if the angular movement of the shaft is less than the distance required to bring the cams 37 and 39 in engagement with their respective pins 73 and 73' of members 70 and 69, the alarm will not be flashed, but one of the cams, as the case may be, may have reached a point wherein the continued angular distance of only a few degrees in that direction will cause its associated alarm to operate. Now, considering an adjusting movement of shaft 28 in another direction a similar angular distance and then in the first direction, at this time a small angular distance of the cam first considered would have caused the operation of the signal while the bath was operating at its proper temperature if this cam had not been returned to normal against its stop as shown in Fig. 2 through the engagement of pins 62 and 62' against stops 63 and 68 by the resetting mechanism above described. However, in case of certain defects in the operating circuit of the apparatus such as for example the failure of the armature device to cause to open or close the operating circuit of the magnet M, one of the motors 11 and 12 will be kept in operation which would cause the thermostat brushes to pass beyond their adjusted position to a point wherein one of the cams 37 and 39 will engage the members 69 and 70 for causing the alarm to operate through the closure of contacts such as 152 shown in Fig. 2.

The characteristic of the heating circuit HC is preferably such that under normal operating condition of the tuning fork and therefore of the chamber FC, brushes 52 and 53 need to swing only a small angular distance over a few of the centrally disposed terminals of the rheostat to maintain the proper operating temperature of the tuning fork chamber FC, under the varying temperature of the room in which this chamber and associated apparatus are located. Owing to the variable normal position of the rheostat brushes the cams 37 and 39 are necessarily returned to normal position upon each change in the direction of movement of shaft 28 and the brushes carried thereby, in order that the operation of the signals be effected in each direction of the brushes at an equal angular distance as defined by the cams 37 and 39 from their normal positions. Any substantial angular movement of the brushes which may be due to the failure of the thermostat T to respond to the adjusting movement of the rheostat or the failure of the motor to properly position the brushes in response to the switching operations of the magnet M under control of the thermostat will cause the movement of the cams 37 and 39 according to the direction of movement of shaft 28 as above mentioned for operating members 69 and 70 and thereby causing the operation of lamp 80.

What is claimed is:

1. In a temperature control apparatus, the combination with a rheostat having a plurality of arcuated rows of contacts, a pair of brushes one for each of said rows, a two-way movable shaft for actuating said brushes, a signaling device, a mechanism actuated by said gearing for causing the operation of said device upon certain limits of unidirectional movement of said brushes on said rows of contacts, said mechanism including a pair of ratchet wheels mounted on said shaft, a cam associated with each of said ratchet wheels, a lever member carried by said shaft, a normally ineffective common member carried by said lever for engaging said wheels, another shaft operatively connecting the rheostat to the first mentioned shaft, a frictionally controlled lever mounted on the last mentioned shaft, a stop carried by the last mentioned member and engaging said common member to cause the same to engage one of said wheels depending upon the direction of movement of said shaft for moving its associated cam, contact actuating members operating through the movement of said cams for causing the operation of said signaling device, means for returning said cams to normal upon a change in the movement of the first mentioned shaft, and a plurality of motors for actuating the latter shaft.

2. In a temperature control apparatus, the combination with a thermostat, a magnet, a circuit therefor and a heater associated with the thermostat, of a plurality of motors, operating circuits therefor, a make and break device in the circuit of said motors controlled by said magnet, a shaft, a gearing mechanism actuated by said motors for moving said shaft in two directions depending upon the operation of said magnet, a rheostat having a row of contacts, a contact member for said rheostat actuated through the movement of said shaft and engaging said contacts for controlling the operation of the heater, camming devices actuated by said shaft, a signaling device operable upon certain limits of movement of each of said camming devices for indicating the operation of said contact member, and a resetting mechanism for returning said device to normal upon a change in the movement of said shaft.

3. In a temperature control apparatus, the combination with a thermostat, a heater associated with the thermostat and a magnet controlled by the operation of the thermostat, of a plurality of motors, operating circuits therefor, a make and break device in the circuit of said motors controlled by said magnet, a shaft, a gearing mechanism actuated by said motors for moving said shaft in two directions depending upon the operation of said magnet, a rheostat having a row of contacts, a brush actuated through the movement of said shaft for engaging said contacts for controlling the operation of the heater, signaling devices, a mechanism actuated by said gearing for causing the operation of said devices upon certain limits of uni-directional movement on said row of contacts, said mechanism including a pair of ratchet wheels, a cam associated with each of said ratchet wheels, a lever member carried by said shaft, a normally ineffective common member carried by said lever for engaging said wheels depending upon the direction of movement of said shaft, an intermediate shaft operatively connecting the rheostat to the first mentioned shaft, a frictionally controlled lever mounted on said intermediate shaft, a stop carried by the last mentioned lever and engaging said common member to cause the same to engage one of said wheels for moving its associated cam, contact actuating members operated through the movement of said cams for causing the operation of said signaling device, and a plurality of automatically operable means for returning said cams to normal upon a change in the movement of the first mentioned shaft.

RALPH E. MALLES.